(12) United States Patent
Feinstein et al.

(10) Patent No.: US 12,383,031 B1
(45) Date of Patent: Aug. 12, 2025

(54) BAND EMPLOYING BISTABLE COMPLIANT SCISSOR LINKAGES

(71) Applicant: Peter A Feinstein Patents, LLC, Palm Beach Gardens, FL (US)

(72) Inventors: Peter A Feinstein, Palm Beach Gardens, FL (US); Ivyann Oveson Running, Orem, UT (US); Isaac Weaver, Provo, UT (US); Nathan Usevitch, Vineyard, UT (US); Brian Jensen, Orem, UT (US); Heather Leany, Norton Shores, MI (US)

(73) Assignee: Peter A Feinstein Patents LLC, Palm Beach Gardens, FL (US)

( * ) Notice: Subject to any disclaimer, the term of this patent is extended or adjusted under 35 U.S.C. 154(b) by 0 days.

(21) Appl. No.: 19/076,629

(22) Filed: Mar. 11, 2025

Related U.S. Application Data

(60) Provisional application No. 63/564,787, filed on Mar. 13, 2024.

(51) Int. Cl.
A44C 5/08 (2006.01)
A44C 5/00 (2006.01)
(Continued)

(52) U.S. Cl.
CPC .............. *A44C 5/08* (2013.01); *A44C 5/0053* (2013.01); *A44C 5/06* (2013.01); *F16G 13/18* (2013.01); *F16G 15/12* (2013.01)

(58) Field of Classification Search
CPC ....... A44C 5/0053; A44C 5/0069; A44C 5/04; A44C 5/06; A44C 5/08; F16G 13/16;
(Continued)

(56) References Cited

U.S. PATENT DOCUMENTS

| | | | | |
|---|---|---|---|---|
| 2,690,049 A | * | 9/1954 | Pinson | A44C 5/08 59/79.1 |
| 2,780,108 A | * | 2/1957 | Bell | F16G 13/18 474/101 |

(Continued)

FOREIGN PATENT DOCUMENTS

| CN | 111550525 A | * | 8/2020 |
|---|---|---|---|
| DE | 102019108709 A1 | * | 10/2020 |

(Continued)

OTHER PUBLICATIONS

Arnouts, L.I.W., "Computational modelling of thetransformation of bistable scissor structureswith geometrical imperfections", Science Direct, Engineering Structures, vol. 177, Dec. 15, 2018, pp. 409-420.

(Continued)

*Primary Examiner* — Jared O Brown
(74) *Attorney, Agent, or Firm* — Forge IP, PLLC

(57) ABSTRACT

A plurality of bistable compliant links are pivotally attached to one another, each of the links having a compliant section and first and second rigid sections extending from the compliant section. The links are pivotally attached to one another via the first and second rigid sections, such that when the links are pivoted with respect to each other past a threshold position toward a closed position, the links are biased toward the closed position by forces created by the compliant sections, and when the links are pivoted with respect to each other past the threshold position toward an open position, the links are biased toward the open position by forces created by the compliant sections. The forces created by the compliant sections biasing the links toward the closed position and biasing the links toward the open position are caused by elastic deformation of the compliant sections.

35 Claims, 11 Drawing Sheets

(51) Int. Cl.
*A44C 5/06* (2006.01)
*F16G 13/18* (2006.01)
*F16G 15/12* (2006.01)

(58) Field of Classification Search
CPC .......... F16G 13/18; F16G 13/20; F16G 13/22; F16G 13/24; E04B 1/3441
USPC .......................................... 59/79.1, 79.3, 80
See application file for complete search history.

(56) References Cited

U.S. PATENT DOCUMENTS

| | | | |
|---|---|---|---|
| 7,204,075 B2 * | 4/2007 | Utaki | F16G 13/16 |
| | | | 59/78.1 |
| 8,234,951 B1 | 8/2012 | Muñoz et al. | |
| 8,789,880 B2 * | 7/2014 | Mackert | F16G 13/20 |
| | | | 297/91 |
| 9,783,977 B2 | 10/2017 | Alqasimi et al. | |
| 10,006,194 B2 | 6/2018 | Matsuoka | |
| 10,006,195 B2 | 6/2018 | Matsuoka | |
| 10,006,196 B1 | 6/2018 | Alqasimi et al. | |
| 12,135,070 B2 * | 11/2024 | Jaeker | F16G 13/16 |
| 2002/0083675 A1 | 7/2002 | Hoberman | |
| 2011/0252717 A1 | 10/2011 | Graf Fernandez | |

FOREIGN PATENT DOCUMENTS

| | | |
|---|---|---|
| FR | 2256994 A1 | 8/1975 |
| GB | 191420834 A * | 1/1915 |
| GB | 1075974 A * | 7/1967 |
| IT | CO20090040 A1 * | 4/2011 |
| WO | WO2018167247 A1 | 9/2018 |
| WO | WO2023180002 A1 | 9/2023 |

OTHER PUBLICATIONS

Gantes, C.J., "Geometric design of arbitrarily curved bi-stable deployable arches with discrete joint size", International Journal of Solids and Structures, vol. 41, Issue 20, Oct. 2004, pp. 5517-5540.
Maden, F., "A Critical Review on Classification and Terminology of Scissor Structures", Journal of the International Association for Shell and Spatial Structures, vol. 60 (2019) No. 1 March n. 199.
Mouaze, N., "Bistable compliant underactuated gripper for the gentle grasp of soft objects", Science Direct, Mechanism and Machine Theory, vol. 170, Apr. 2022, 104676.

* cited by examiner

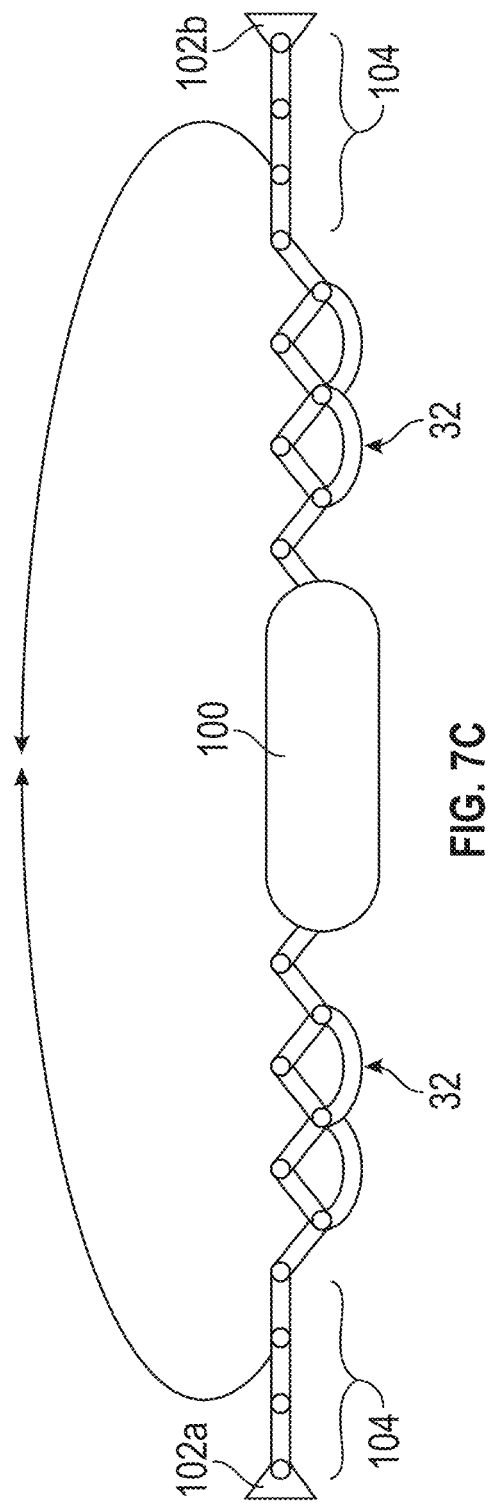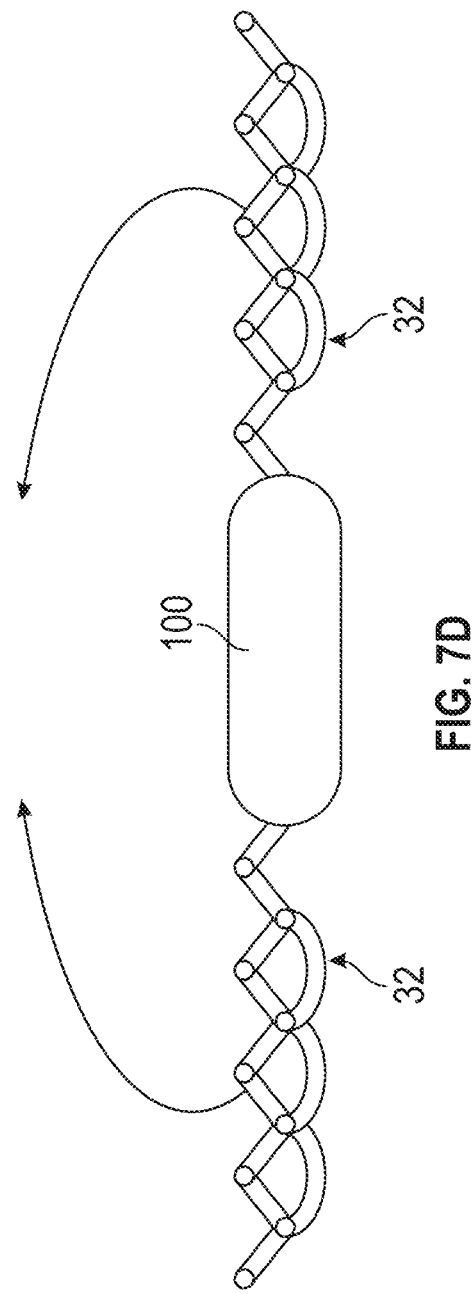

BAND EMPLOYING BISTABLE COMPLIANT SCISSOR LINKAGES

FIELD OF THE INVENTION

This disclosure relates generally to bands of material, such as for a watchband or other attachment or fixation system, employing bistable compliant scissor linkages to achieve a biased-open configuration and biased-closed configuration of the band.

BACKGROUND OF THE INVENTION

Electronic devices and other apparatuses, such as wearable devices like smart watches, heart rate monitors, or fitness monitors, may be attached to one or more body parts of a user utilizing attachment structures, such as bands. To meet various fitting requirements, it is preferred that wearable bands have open and closed positions, and that is relatively easy for the wearer to switch between the two. It is further preferred that wearable bands, especially those to be worn on a wrist or arm, require very simple one-handed operation. Most preferable would be a wearable band that required no use of the opposite hand other than to position or place the object on the desired location, after which the band is capable of completing the attachment by itself automatically as a hands-free operation upon activation or triggering by the wearer.

Conventional bands, such as watch bands, jewelry bands, magnetic health bands, bracelets, and necklaces, typically include expanding linkages and non-expanding linkages. However, such bands often are very delicate and flimsy and do not hold up well to physical exercise, fitness activities and sports.

Most conventional bands use clasps to open and close the bands. Traditional clasp mechanisms come in various forms. Buckle and tether clasp mechanisms rely on mechanical features to keep the band or flap closed. Buckle and tether mechanisms can provide one-handed operation and can be adjusted, but they are often not easy to use in one handed operation. Hook-and-loop fasteners, such as Velcro®-like fasteners, can be adjusted and opened or closed by one hand, but they are not aesthetically pleasing. Button and hole clasps can be adjustable if there are multiple holes, but they are difficult to operate one-handed and the length adjustment is limited by the locations of the holes. Magnetic closure mechanisms use a post and hole configuration for alignment of the magnetic closure for mechanical retention in shear. Such magnetic closures are operable by one-hand but have limitations.

Generally, conventional bands with clasps require somewhat complicated manipulation by the wearer, which may make them difficult to wear for those with various disabilities, for the very young, for the very old, etc. Thus, there is still a need to provide an improved wearable band which is suitable for one handed or even hands free operation. Desirably, the wearable band is able to clasp automatically upon putting onto a body with little if any input required for the wearer to activate/trigger the band from the opened to the closed position.

The present invention, therefore, aims to remedy the problems associated with known bands by providing a band, such as a watch band or other wearable band, that is suitable for very simple one handed or hands free operation and that can assemble around a body part upon being positioned onto the body part with little, if any, input required for the wearer to activate/trigger the band from the opened to the closed position.

SUMMARY OF THE INVENTION

The present invention achieves these objectives by providing a band of material, such as for a watchband or other attachment or fixation system, utilizing scissor linkages employing a bistable compliant mechanism configuration.

As is known, bistable compliant mechanisms are generally monolithic (though such is not strictly necessary) devices with two stable equilibrium positions separated by an unstable equilibrium position. They gain their bistable behavior from the energy stored in the flexible segments, which deflect to allow mechanism motion. This approach integrates desired mechanism motion and energy storage to create bistable mechanisms with dramatically reduced part count compared to traditional mechanisms incorporating rigid links, joints, and springs. As a deflection is applied to the mechanism, it rapidly transitions from one stable position to the next, with an optional preload stabilizing the mechanism for lower force inputs. The force-deflection response for a typical bistable mechanism is illustrated in graphical form in FIG. 1.

As can be seen, bistable compliant mechanisms do not require power to be held in either of their stable positions. Thus, bistable compliant mechanisms have been used and/or proposed to be used as switches, latches, relays or the like, thereby eliminating friction and improving the reliability and precision of those mechanical devices.

The present invention incorporates bistable compliant mechanisms into the inventive self-applying, self-removing, band of material, such as for a watchband or other wearable band.

In accordance with one particular exemplary embodiment of the present invention, a band includes a plurality of bistable compliant links cooperating with one another, each of links including a compliant section having first and second ends, a first rigid section extending from the first end of the compliant section, the first rigid section having first and second ends, and a second rigid section extending from the second end of the compliant section, the second rigid section having first and second ends. The first rigid section of a first link is pivotally connected to the second rigid section of a second link at a point adjacent to the first end of the first rigid section of the first link and at a point adjacent to the first end of the second rigid section of the second link and is pivotally connected to the second rigid section of a fourth link at a point adjacent to the second end of the first rigid section of the first link and at a point adjacent to the second end of the second rigid section of the fourth link. The second rigid section of the first link is pivotally connected to the first rigid section of a third link at a point adjacent to the first end of the second rigid section of the first link and at a point adjacent to the first end of the first rigid section of the third link and is pivotally connected to the second rigid section of a fifth link at a point adjacent to the second end of the second rigid section of the first link and at a point adjacent to the second end of the first rigid section of the fifth link. When the plurality of links are pivoted with respect to each other past a threshold position toward a closed position, the plurality of links are biased toward the closed position by forces created by the compliant sections of the plurality of links and when the plurality of links are pivoted with respect to each other past the threshold position toward an open position, the plurality of links are biased toward the open position by forces created by the compliant sections of the plurality of links.

In some embodiments, the second rigid section of the second link is pivotally connected to the first rigid section of the third link at a point adjacent to the second end of the second rigid section of the second link and at a point adjacent to the second end of the first rigid section of the third link. In certain of these embodiments, the second rigid section of the fourth link is pivotally connected to the first rigid section of the second link at a point adjacent to the first end of the second rigid section of the fourth link and at a point adjacent to the first end of the first rigid section of the second link. In certain embodiments, the second rigid section of the third link is pivotally connected to the first rigid section of the fifth link at a point adjacent to the first end of the second rigid section of the third link and at a point adjacent to the first end of the first rigid section of the fifth link.

In some embodiments, the forces created by the compliant sections biasing the plurality of links toward the closed position and biasing the plurality of links toward the open position are caused by elastic deformation of the compliant sections. In certain of these embodiments, the forces created by elastic deformation of the compliant sections increase as the plurality of links are pivoted with respect to each other from the open position toward the threshold position and from the closed position toward the threshold position, and wherein the forces created by elastic deformation of the compliant sections decrease as the plurality of links are pivoted with respect to each other from the threshold position toward the open position and from the threshold position toward the closed position.

In some embodiments, the compliant section, the first rigid section and the second rigid section of each link are formed as a monolithic unit. In some embodiments, for each of the plurality of links, the compliant section, the first rigid section and the second rigid section are formed as separate elements that are connected to one another. In certain of these embodiments, for each of the plurality of links, the first rigid section is pivotally connected to the first end of the compliant section, and the second rigid section is pivotally connected to the second end of the compliant section.

In some embodiments, each of the compliant sections has an arcuate cross-section. In some embodiments, each of the rigid sections is generally straight in cross-section. In some embodiments, each of the rigid sections has an arcuate cross-section. In some embodiments, the band further includes a plurality of passive links in addition to the plurality of bistable compliant links.

In some embodiments, each of said plurality of bistable compliant links comprises a material selected from the group consisting of polypropylene, acrylonitrile butadiene styrene (ABS), acrylic, poly (lactic acid) (PLA), silicone, rubber, polyethylene terephthalate glycol (PETG), flexible glass, stainless steel, aluminum, copper, titanium, carbon fiber, wood and combinations thereof. In certain of these embodiments, each of said plurality of bistable compliant links comprises at least one of the following materials: polypropylene, acrylonitrile butadiene styrene (ABS), stainless steel and aluminum.

In some embodiments, the plurality of bistable compliant links define an article of jewelry or a watch band configured to be attached to a watch body. In some embodiments, the plurality of bistable compliant links define a medical article selected from the group consisting of a medical instrument holder, a cuff attachment for scrubs, a compression bandage, a blood pressure cuff, and a cuff for affixing cold or heat wraps. In some embodiments, the plurality of bistable compliant links define a safety tether for a gaming device. In some embodiments, the plurality of bistable compliant links are incorporated into a flexible mobile communications device adapted to wrap around a body part. In some embodiments, the plurality of bistable compliant links define a cot or a sleeping pad.

In accordance with another aspect of the present invention, a band includes a plurality of bistable compliant links pivotally attached to one another, each of the plurality of links having a compliant section, a first rigid section extending from the compliant section, and a second rigid section extending from the compliant section. The plurality of links are pivotally attached to one another via the first and second rigid sections, such that when the plurality of links are pivoted with respect to each other past a threshold position toward a closed position, the plurality of links are biased toward the closed position by forces created by the compliant sections of the plurality of links and when the plurality of links are pivoted with respect to each other past the threshold position toward an open position, the plurality of links are biased toward the open position by forces created by the compliant sections of the plurality of links. The forces created by the compliant sections biasing the plurality of links toward the closed position and biasing the plurality of links toward the open position are caused by elastic deformation of the compliant sections.

In some embodiments, the first rigid section of a first link is pivotally connected to the second rigid section of a second link, the second rigid section of the first link is pivotally connected to the first rigid section of a third link, and the second rigid section of the second link is pivotally connected to the first rigid section of the third link.

In some embodiments, the forces created by elastic deformation of the compliant sections increase as the plurality of links are pivoted with respect to each other from the open position toward the threshold position and from the closed position toward the threshold position, and the forces created by elastic deformation of the compliant sections decrease as the plurality of links are pivoted with respect to each other from the threshold position toward the open position and from the threshold position toward the closed position.

In some embodiments, the compliant section, the first rigid section and the second rigid section of each link are formed as a monolithic unit. In some embodiments, for each of the plurality of links, the compliant section, the first rigid section and the second rigid section are formed as separate elements that are connected to one another. In certain of these embodiments, for each of the plurality of links, the first rigid section is pivotally connected to a first end of the compliant section and the second rigid section is pivotally connected to a second end of the compliant section.

In some embodiments, each of the compliant sections has an arcuate cross-section. In some embodiments, each of the rigid sections is generally straight in cross-section. In some embodiments, each of the rigid sections has an arcuate cross-section. In some embodiments, the band further includes a plurality of passive links in addition to the plurality of bistable compliant links.

In some embodiments, each of said plurality of bistable compliant links comprises a material selected from the group consisting of polypropylene, acrylonitrile butadiene styrene (ABS), acrylic, poly (lactic acid) (PLA), silicone, rubber, polyethylene terephthalate glycol (PETG), flexible glass, stainless steel, aluminum, copper, titanium, carbon fiber, wood and combinations thereof. In certain of these embodiments, each of said plurality of bistable compliant links comprises at least one of the following materials: polypropylene, acrylonitrile butadiene styrene (ABS), stainless steel and aluminum.

In accordance with a further aspect of the present invention, a band includes a plurality of bistable compliant links cooperating with one another, each of the plurality of links including a compliant section having first and second ends, a first rigid section extending from the first end of the compliant section, the first rigid section having first and second ends, and a second rigid section extending from the second end of the compliant section, the second rigid section having first and second ends. The first rigid section of a first link is pivotally connected to the second rigid section of a second link at a point adjacent to the first end of the first rigid section of the first link and at a point adjacent to the first end of the second rigid section of the second link. The second rigid section of the first link is pivotally connected to the first rigid section of a third link at a point adjacent to the first end of the second rigid section of the first link and at a point adjacent to the first end of the first rigid section of the third link. The second rigid section of the second link is pivotally connected to the first rigid section of the third link at a point adjacent to the second end of the second rigid section of the second link and at a point adjacent to the second end of the first rigid section of the third link. When the plurality of links are pivoted with respect to each other past a threshold position toward a closed position, the plurality of links are biased toward the closed position by forces created by the compliant sections of the plurality of links and when the plurality of links are pivoted with respect to each other past the threshold position toward an open position, the plurality of links are biased toward the open position by forces created by the compliant sections of the plurality of links.

In some embodiments, the forces created by the compliant sections biasing the plurality of links toward the closed position and biasing the plurality of links toward the open position are caused by elastic deformation of the compliant sections. In certain of these embodiments, the forces created by elastic deformation of the compliant sections increase as the plurality of links are pivoted with respect to each other from the open position toward the threshold position and from the closed position toward the threshold position, and the forces created by elastic deformation of the compliant sections decrease as the plurality of links are pivoted with respect to each other from the threshold position toward the open position and from the threshold position toward the closed position.

The present invention, as set out above in various respects, provides a band, such as a watch band or other wearable band, that is suitable for very simple one handed or hands free operation and that can assemble around a body part upon being positioned onto the body part with little, if any, input required for the wearer to activate/trigger the band from the opened to the closed position.

Other features and advantages of the invention will become more apparent from consideration of the following drawings and written description.

BRIEF DESCRIPTION OF THE DRAWINGS

FIGS. 7C and 7D are side elevational views of bands configured in accordance with the exemplary embodiment shown in FIG. 3, where the bands are also employed as watch bands;

FIGS. 9A and 9B are side isometric views of a band, shown respectively in an open position and a closed position, configured in accordance with the exemplary embodiment shown in FIG. 3, where the band is employed as a cuff closure for medical scrubs or the like;

FIGS. 10A and 10B are side elevational views of a band, shown respectively in an open position and a closed position, configured in accordance with the exemplary embodiment shown in FIG. 3, where the band is employed as a wrap to secure heat packs, cold packs or the like;

FIGS. 11A and 11B are side isometric views of a band, shown respectively in an open position and a closed position, configured in accordance with the exemplary embodiment shown in FIG. 3, where the band is employed as a safety tether for a gaming device or the like; and FIGS. 12A and 12B are side isometric views of a band, shown respectively in an open position and a closed position, configured in accordance with the exemplary embodiment shown in FIGS. 6A and 6B, where the band is employed as a cot, a sleeping pad or the like.

DETAILED DESCRIPTION OF THE INVENTION

Figure 1:
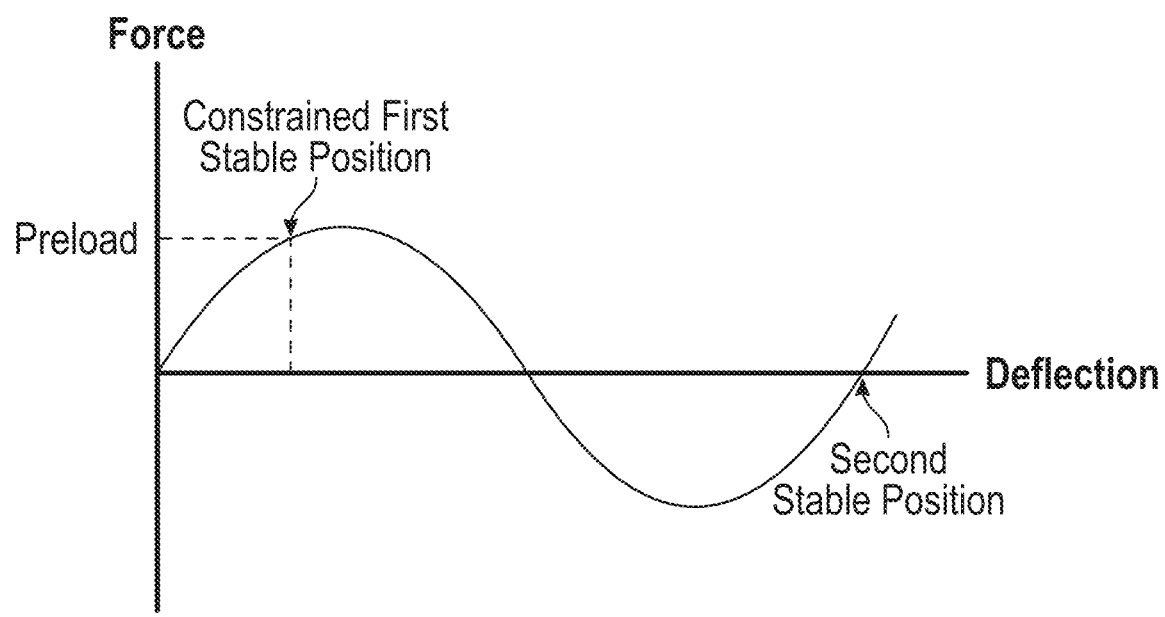
FIG. 1 is a graph depicting a force-deflection response for a typical bistable mechanism.

The present invention may be further understood with reference to the following description and the appended drawings, wherein like elements are referred to with the same reference numerals. Many of the exemplary embodiments of the present invention describe bands used as wearables configured to wrap around a body part (e.g., a wrist, an ankle, etc.) of a wearer. It should be understood, however, that the present invention may be implemented in various other configurations and on various other scales, both smaller and larger than typical wearables.

Figure 2:
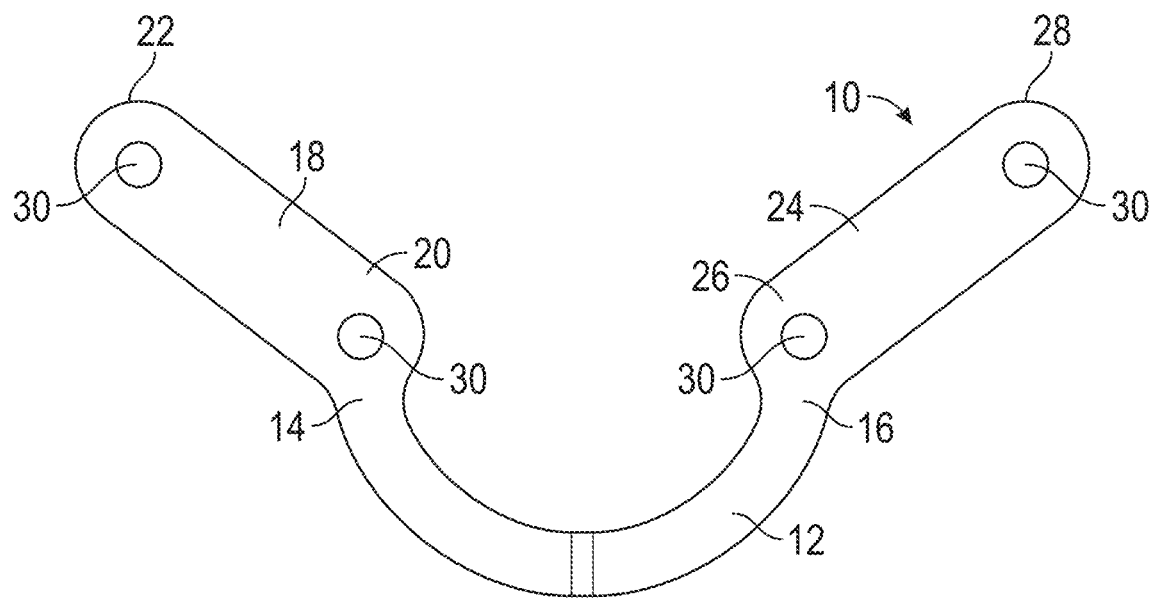
FIG. 2 is a side elevational view of an exemplary embodiment of a single bistable compliant link that may be employed by a band configured in accordance with an exemplary embodiment of the present invention.

FIG. 2 generally illustrates a first embodiment of a bistable compliant link (10) that may be employed by a band configured in accordance with the present invention. The link (10) includes a compliant section (12) having a first end (14) and a second end (16). In this embodiment, the compliant section (12) is arcuate in cross section, although such is not strictly necessary. For example, the compliant section (12) could have a V-shape or define a 90° bend or the like.

It should be understood that what is meant by "compliant" is that the section (12) is capable of undergoing elastic deformation when forces appropriate for the given configuration are exerted thereon. For example, as would be understood by a skilled artisan, the forces appropriate for causing elastic deformation of the links when employed as part of a watch band would be relatively small, as compared, for example, to the forces appropriate for causing elastic deformation if the links were employed as part of a cot, a sleeping pad or the like (as discussed further below).

The link (10) also includes a first rigid section (18) extending from the first end (14) of the compliant section (12), the first rigid section (18) having a first end (20) proximate to the compliant section (12) and a second end (22) distal to the compliant section (12), and a second rigid section (24) extending from the second end (16) of the compliant section (12), the second rigid section (24) having a first end (26) proximate to the compliant section (12) and a second end (28) distal to the compliant section (12). In the embodiment shown in FIG. 2, each of the rigid sections (18, 24) is generally straight in cross-section, although such is not strictly required (as described further below).

What is meant by "rigid" is that the first and second rigid sections (18, 24) are generally not elastically deformable when subjected to substantially the same forces that cause elastic deformation of the compliant section (12). This may be achieved in a number of ways, as will be understood by those skilled in the art. For example, as shown in the exemplary embodiment of FIG. 2, the compliant section (12), the first rigid section (18) and the second rigid section (24) may be formed as a monolithic unit. In such case, the link (10) may be homogeneously formed from a single material, with the compliant nature of the compliant section (12) and the rigid nature of the first and second rigid sections (18, 24) being achieved by varying the thickness and/or shape of the various sections with respect to one another. Alternately, the compliant section (12) and the first and second rigid sections (18, 24) may be formed as a single unit, but may be formed of different materials, such as may be accomplished by injection molding different materials into different areas of a single mold. As another alternative, the compliant section (12) and the first and second rigid sections (18, 24) may be formed separately and then subsequently joined together. In such cases, the compliant nature of the compliant section (12) and the rigid nature of the first and second rigid sections (18, 24) may be achieved either by varying the thickness and/or shape of the various sections with respect to one another, by varying the materials used to create the compliant section (12) and the first and second rigid sections (18, 24), or by doing both. Other alternatives are also possible.

Openings (30) are provided in various locations (e.g., at the first and second ends of the first and second rigid sections) for receiving pins or the like (not shown) to allow for various pivotal connections to be achieved, as discussed in more detail below.

Figure 3:
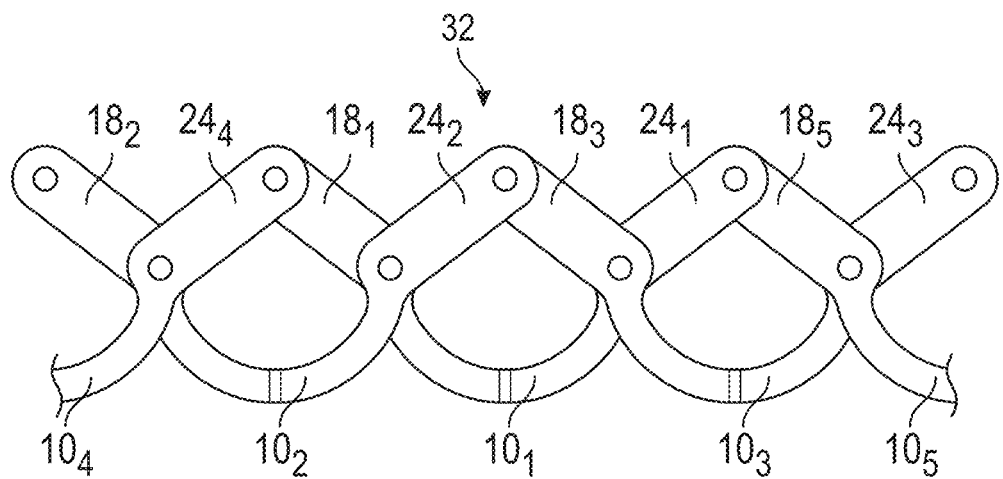
FIG. 3 is a side elevational view of a band configured in accordance with an exemplary embodiment of the present invention incorporating a plurality of the links illustrated in FIG. 2, with the band shown in an open position.

Referring now to FIG. 3, a band (32) in accordance with one particular exemplary embodiment of the present invention includes a plurality of bistable compliant links cooperating with one another. Three full links and two partial links are shown in FIG. 3, but it should be understood that a greater or fewer number of links may be provided. Also, while all of the links in the illustrated embodiment appear to be identical, it should be understood that such is not required.

As shown, the first rigid section ($18_1$) of a first link ($10_1$) is pivotally connected to the second rigid section ($24_2$) of a second link ($10_2$) at a point adjacent to the first end of the first rigid section ($18_1$) of the first link ($10_1$) and at a point adjacent to the first end of the second rigid ($24_2$) section of the second link ($10_2$) and is pivotally connected to the second rigid section ($24_4$) of a fourth link ($10_4$) at a point adjacent to the second end of the first rigid section ($18_1$) of the first link ($10_1$) and at a point adjacent to the second end of the second rigid section ($24_4$) of the fourth link ($10_4$). The second rigid section ($24_1$) of the first link ($10_1$) is pivotally connected to the first rigid section ($18_3$) of a third link ($10_3$) at a point adjacent to the first end of the second rigid section ($24_1$) of the first link ($10_1$) and at a point adjacent to the first end of the first rigid section ($18_3$) of the third link ($10_3$) and is pivotally connected to the first rigid section ($18_5$) of a fifth link ($10_5$) at a point adjacent to the second end of the second rigid ($24_1$) section of the first link ($10_1$) and at a point adjacent to the second end of the first rigid ($18_5$) section of the fifth link ($10_5$).

Also in the shown embodiment, the second rigid section ($24_2$) of the second link ($10_2$) is pivotally connected to the first rigid section ($18_3$) of the third link ($10_3$) at a point adjacent to the second end of the second rigid section ($24_2$) of the second link ($10_2$) and at a point adjacent to the second end of the first rigid section ($18_3$) of the third link ($10_3$). Additionally, in the shown embodiment, the second rigid section ($24_4$) of the fourth link ($10_4$) is pivotally connected to the first rigid section ($18_2$) of the second link ($10_2$) at a point adjacent to the first end of the second rigid section ($24_4$) of the fourth link ($10_4$) and at a point adjacent to the first end of the first rigid section ($18_2$) of the second link ($10_2$). Further shown is that the second rigid section ($24_3$) of the third link ($10_3$) is pivotally connected to the first rigid section ($18_5$) of the fifth link ($10_5$) at a point adjacent to the first end of the second rigid section ($24_3$) of the third link ($10_3$) and at a point adjacent to the first end of the first rigid section ($18_5$) of the fifth link ($10_5$).

Figure 4:
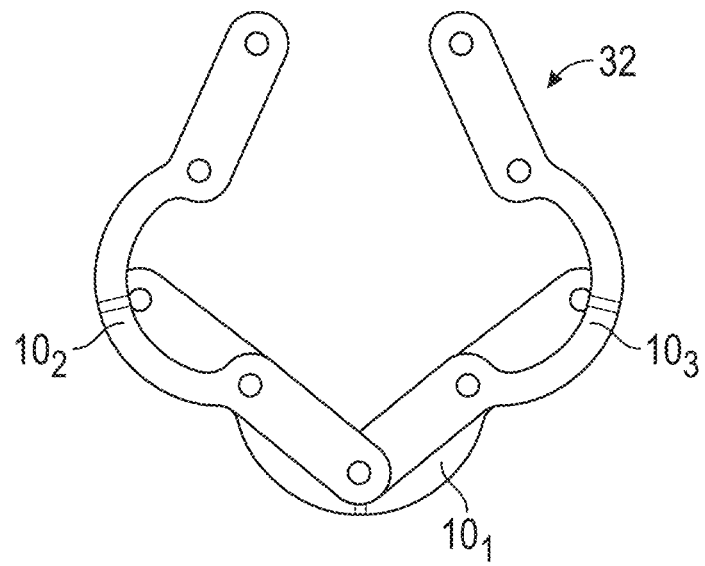
FIG. 4 is a side elevational view of a band configured in accordance with an exemplary embodiment of the present invention incorporating a plurality of the links illustrated in FIG. 2, with the band shown in a closed position.

FIG. 3 shows the band (32) in an open position, whereas FIG. 4 shows the same band (32)—with the fourth link ($10_4$) and the fifth link ($10_5$) being omitted for the sake of simplicity—in a closed position. As can be envisioned by comparing FIGS. 3 and 4, as the plurality of links (10) are pivoted with respect to each other from the open position (shown in FIG. 3) toward the closed position (shown in FIG. 4), the rigid sections (18, 24) of the links (10) are caused to pivot with respect to each other, while at the same time, the compliant sections of the links (10) are caused to stretch, thereby attempting to bias the links back to the open position, wherein the compliant sections are in a relaxed state. However, if the links (10) are continued to be pivoted against the bias and toward the closed position past a threshold position, the bias caused by the deformation of the compliant sections of the plurality of links reverses, such that the plurality of links (10) now become biased toward the closed position (shown in FIG. 4) by forces created by the compliant sections. Again, as will be understood by those skilled in the art, the same stretching (i.e., elastic deformation) of the compliant sections (12), bias, and reversal of said bias occurs when the plurality of links (10) are pivoted with respect to each from the closed position (shown in FIG. 4) past the threshold position and toward the open position (shown in FIG. 3).

As will be understood, the compliant sections (12) of the links (10) may be in a relaxed state both when the links (10) are the open position (shown in FIG. 3) and in the closed position (shown in FIG. 4), while maximum bias is created at the threshold position, at which the bias reverses direction. As such, the forces created by elastic deformation of the compliant sections (12) increase as the plurality of links are pivoted with respect to each other from the open position toward the threshold position and from the closed position toward the threshold position, and the forces created by elastic deformation of the compliant sections (12) decrease as the plurality of links are pivoted with respect to each other from the threshold position toward the open position and from the threshold position toward the closed position.

The precise forces caused by elastic deformation can be controlled, as desired for different applications, by varying the configuration (e.g., the size and/or shape) of the links and/or by varying the materials of which the links are created.

While any of numerous materials may be used (and indeed, with proper design, almost any material can be used in compliant mechanisms), it has been found that employing the following materials for creating each of the plurality of bistable compliant links (10) provide acceptable results. For compliant sections (12), various polymers can be employed, such as polypropylene, acrylonitrile butadiene styrene (ABS), acrylic, poly (lactic acid) (PLA), silicone, rubber, and polyethylene terephthalate glycol (PETG), as can be flexible glass. For rigid sections (24), various metals can be employed, such as stainless steel, aluminum, copper and titanium, as can be carbon fiber, and wood. These materials, and various combinations thereof, can be layered with other materials (such as silicone, fabric, leather, etc.) to increase comfort and/or aesthetic appeal. Of these materials, the following have been found to be particularly desirable: polypropylene, acrylonitrile butadiene styrene (ABS), stainless steel, aluminum and combinations thereof. Of course, those skilled in the art will recognize that other materials now known or later developed may also be used instead of or in conjunction with those listed. Additionally, various combinations of the listed materials, with each other or with non-listed materials may also provide desirable results.

Figure 5A:
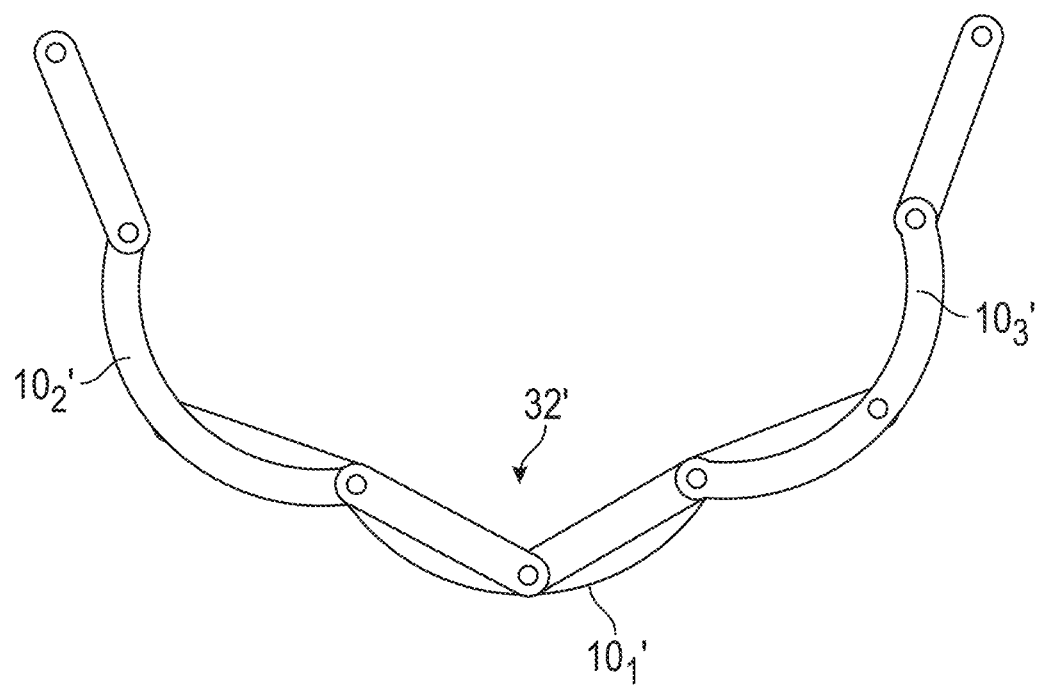
FIGS. 5A and 5B are side elevational and side isometric views, respectively, of a band configured in accordance with another exemplary embodiment of the present invention incorporating a plurality of links, each of which is defined by several components connected together, rather than each link being defined as a single monolithic component.
Figure 5B:
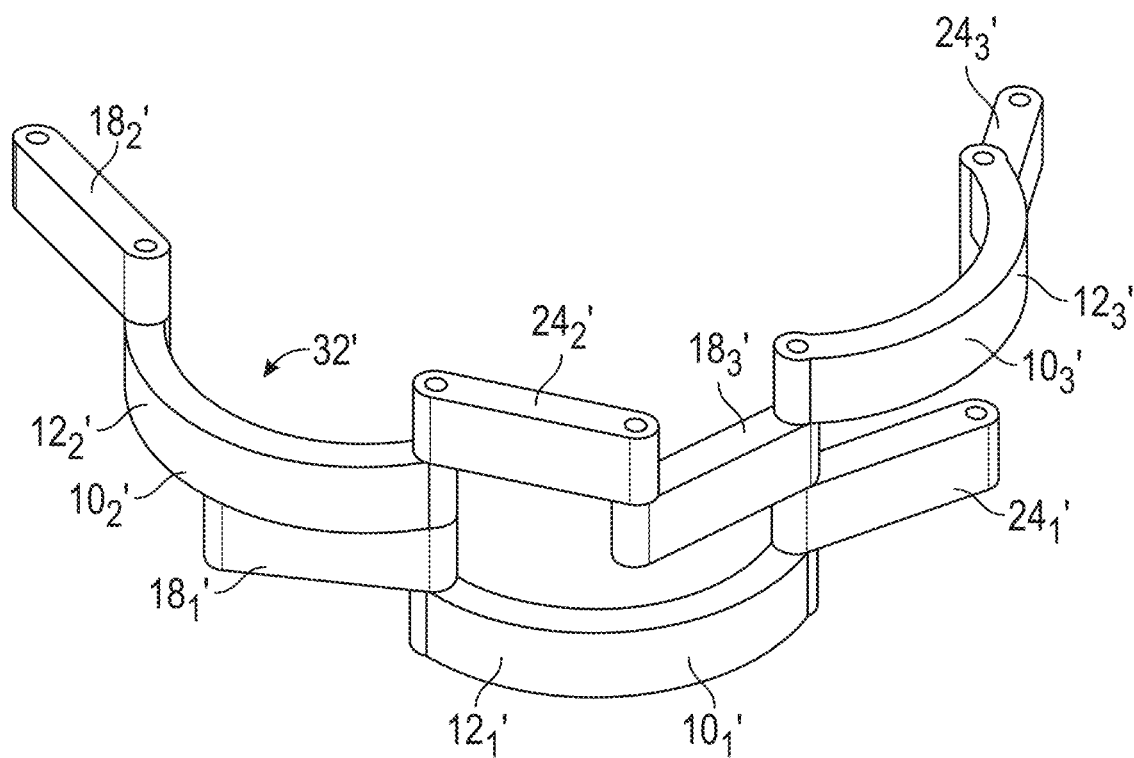

Referring now to FIGS. 5A and 5B, a band (32') configured in accordance with another exemplary embodiment of the present invention is shown. The main difference between the band (32') shown here and the band (32) shown in FIGS. 2-4 is that each of the plurality of links ($10_1'$, $10_2'$, $10_3'$) is defined by several components connected together, rather than each link (10) being defined as a single monolithic component. More specifically, in the shown embodiment, each of links ($10_1'$, $10_2'$, $10_3'$) includes a first rigid section ($18_1'$, $18_2'$, $18_3'$) that is pivotally connected to a first end of a compliant section ($12_1'$, $12_2'$, $12_3'$), and a second rigid section ($24_1'$, $24_2'$, $24_3'$) that is pivotally connected to a second end of the compliant section ($12_1'$, $12_2'$, $12_3'$). In all material respects, this embodiment operates substantially as described above in connection with the embodiment shown in FIGS. 2-4.

Figure 6A:
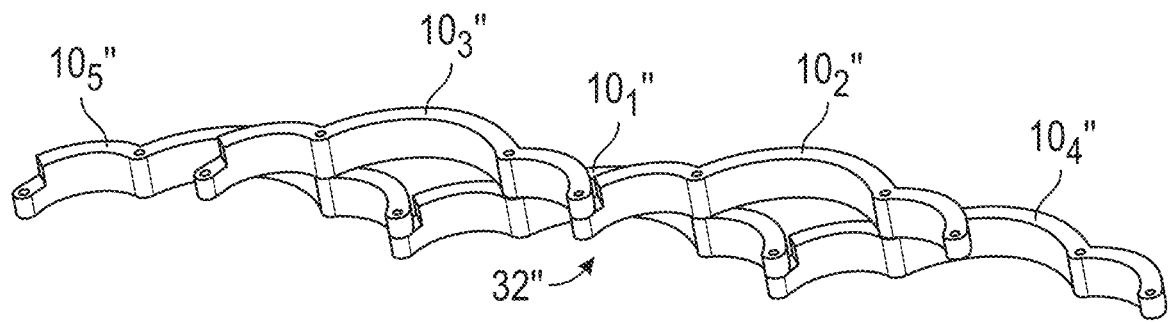
FIGS. 6A and 6B are side isometric views of a band, shown respectively in an open position and a closed position, configured in accordance with another exemplary embodiment of the present invention incorporating a plurality of links, each of which is defined by several arcuate sections instead of a combination of straight and arcuate sections.
Figure 6B:
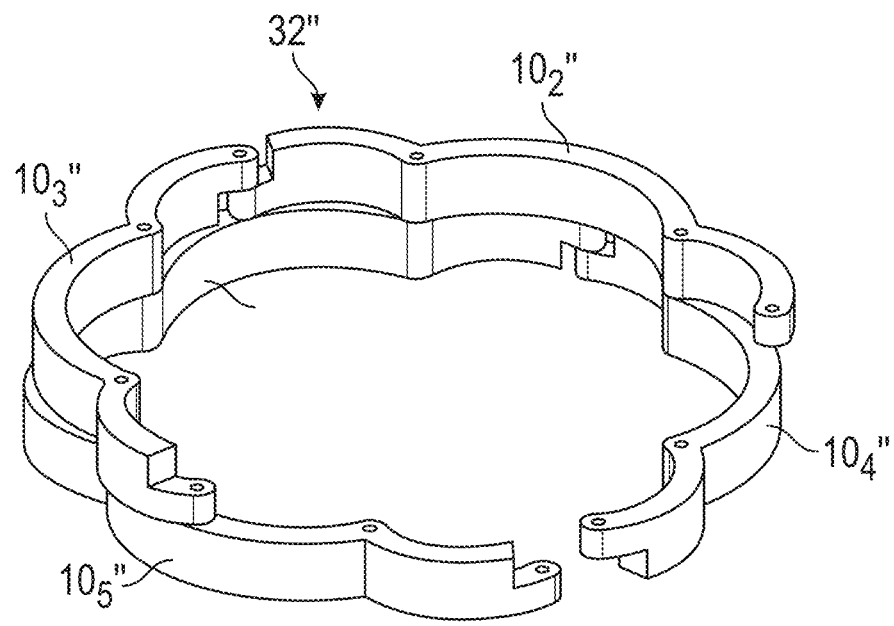

With respect to FIGS. 6A and 6B, a band (32") configured in accordance with another exemplary embodiment of the present invention is shown. The main difference between the band (32") shown here and the band (32) shown in FIGS. 2-4 is that each of the plurality of links ($10_1"$, $10_2"$, $10_3"$, $10_4"$, $10_5"$) includes arcuate rigid sections as opposed to generally straight rigid sections. In all material respects, this embodiment operates substantially as described above in connection with the embodiment shown in FIGS. 2-4.

Figure 7A:
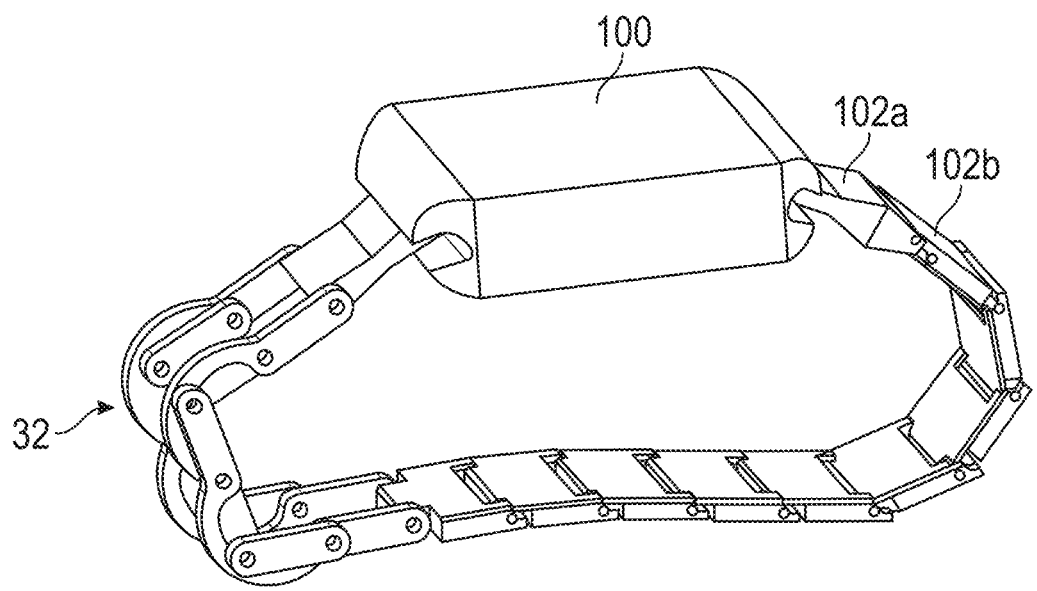
FIGS. 7A and 7B are side isometric views of a band, shown respectively in a closed position and an open position, configured in accordance with the exemplary embodiment shown in FIG. 3, where the band is employed as a watch band.
Figure 7B:
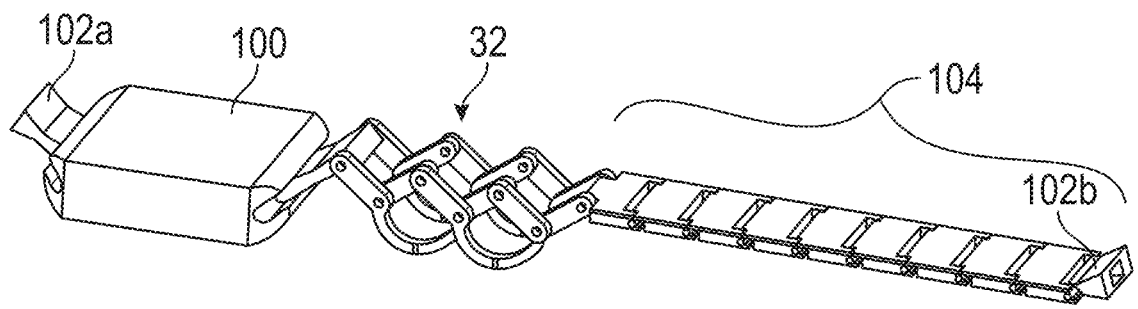

It is contemplated that the bands (32, 32', 32") configured in accordance with the present invention can be employed in a wide variety of applications. FIGS. 7A and 7B show a band (32) comprising part of a watch assembly including a watch body (100) and a closure (102a, 102b) of substantially any known type. In the shown embodiment, the band (32) comprises a plurality of compliant links (10) as described above, as well as a plurality of passive links (104), which may or may not be similar to well-known watch bands. The passive links (104) are generally rigid links that do not have bistable characteristics themselves. Stated another way, this embodiment could also be described as combining a series of compliant links (10) with a series of rigid links (104) that have no stiffness in their joints.

In this embodiment, the band (32) comprising a plurality of compliant links (10) in accordance with the present invention may be used to trigger closure of the watch band by causing the passive links to move toward a closed position such that the closure (102a, 102b) engages. However, it should be understood that the provision of passive links is not required, and it is certainly envisioned that the band (32) may be defined entirely by compliant links (10) in accordance with the present invention.

FIG. 7C shows a band (32) comprising part of a watch assembly very similar to that shown in FIGS. 7A and 7B, including a watch body (100) and a closure (102a, 102b) of substantially any known type. However, in this shown embodiment, the watch band incorporated two bands (32), each comprising a plurality of compliant links (10) as described above, as well as two sections defined by passive links (104), which may or may not be similar to well-known watch bands, as described above. In this embodiment, the bands (32) comprising a plurality of compliant links (10) in accordance with the present invention may be used to trigger closure of the watch band by causing the passive links to move toward a closed position such that the closure (102a, 102b) engages, as indicated by arrows in FIG. 7C.

Like FIG. 7C, FIG. 7D shows a watch band incorporated two bands (32), each comprising a plurality of compliant links (10) as described above. However, in this embodiment, no passive links are provided, nor is any clasp arrangement. In this embodiment, the bands (32) comprising a plurality of compliant links (10) in accordance with the present invention may be used to, upon being triggered, move toward a closed position, as indicated by arrows in FIG. 7D, such that the bands (32) themselves wrap around a wrist of the wearer in order to secure the watch in place.

As will be understood, the closing operation resulting from the use of compliant links (10) (whether all compliant links or a combination of compliant links and passive links) may facilitate one-handed operation of the watch band, which may be of great aid to those with various disabilities. A similar configuration may be employed without the watch body, such that the band may be employed in connection with an article of jewelry, such as a bracelet.

Figure 8A:
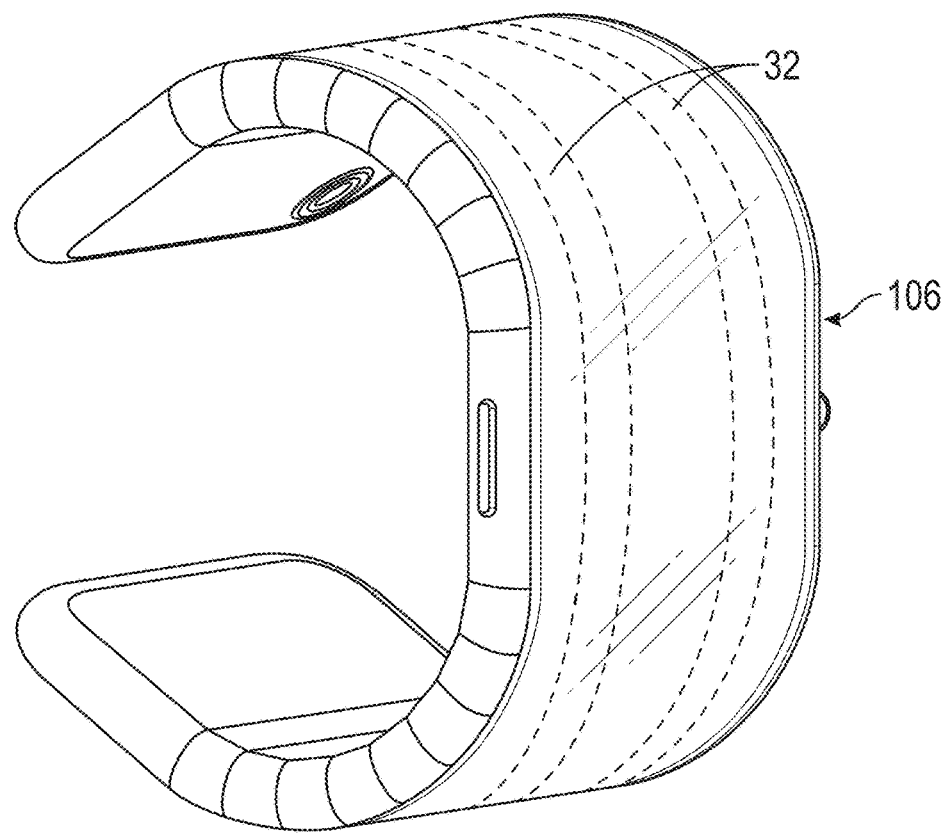
FIGS. 8A and 8B are side isometric views of a flexible mobile communications device, such as a mobile phone, adapted to wrap around a body part, shown respectively alone and as applied to the wrist of a wearer, incorporating at least one band configured in accordance with the present invention.
Figure 8B:
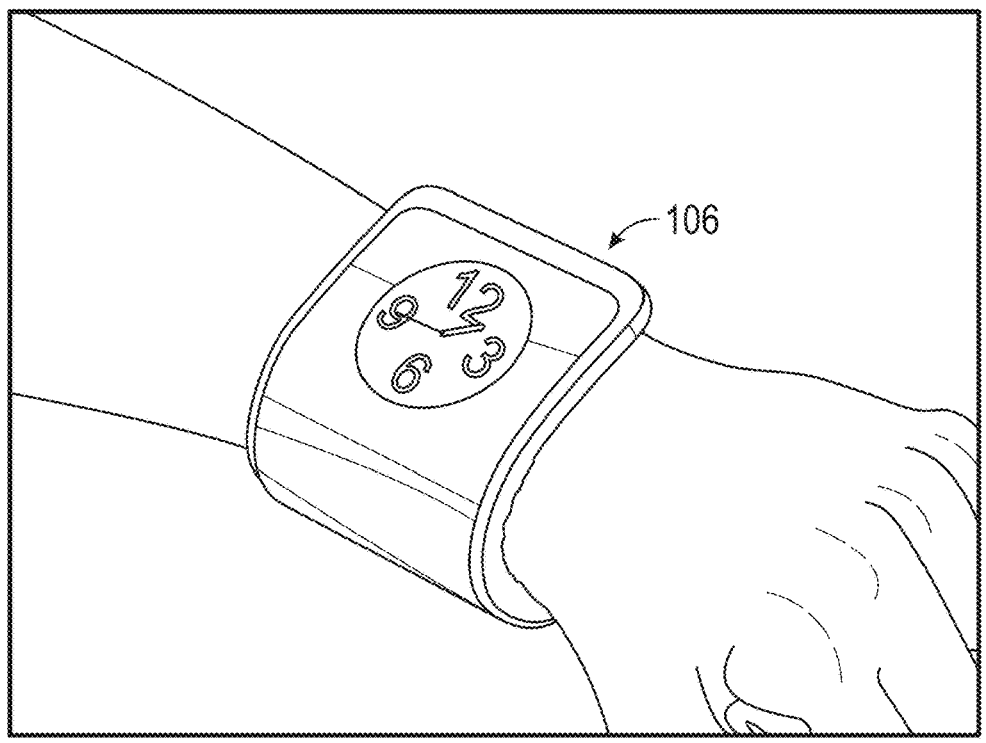

FIG. 8A shows two bands (32) configured in accordance with the present invention embedded into (as indicated by dashed lines) a flexible mobile communications device (106), such as a flexible mobile phone. The bands (32) are adapted to allow the flexible mobile communications device (106) to be wrapped around a body part, such as a wrist, and secure it in place (as shown in FIG. 8B). Two bands (32) are illustrated, although it should be understood that a single band, or more than two bands, may be employed. It is also contemplated that one or more bands according to the present invention may be attached externally to a mobile communications device, as if the device was a large watch. In such instance (i.e., an external closure maintenance mechanism), the band(s) may be provided with or without a clasp, closure or the like, as discussed herein with respect to watch band embodiments. This would allow the wearer to position/anchor/affix the mobile communications device to the wrist once the device is bent into an appropriate position.

Figure 9A:
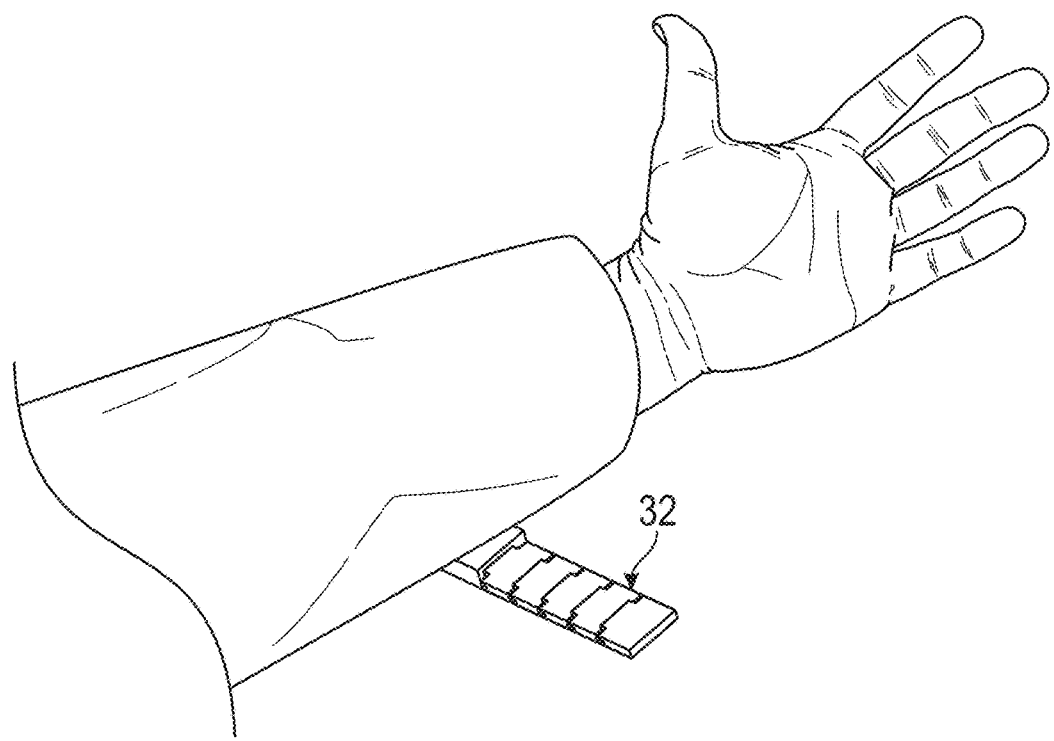
Figure 9B:
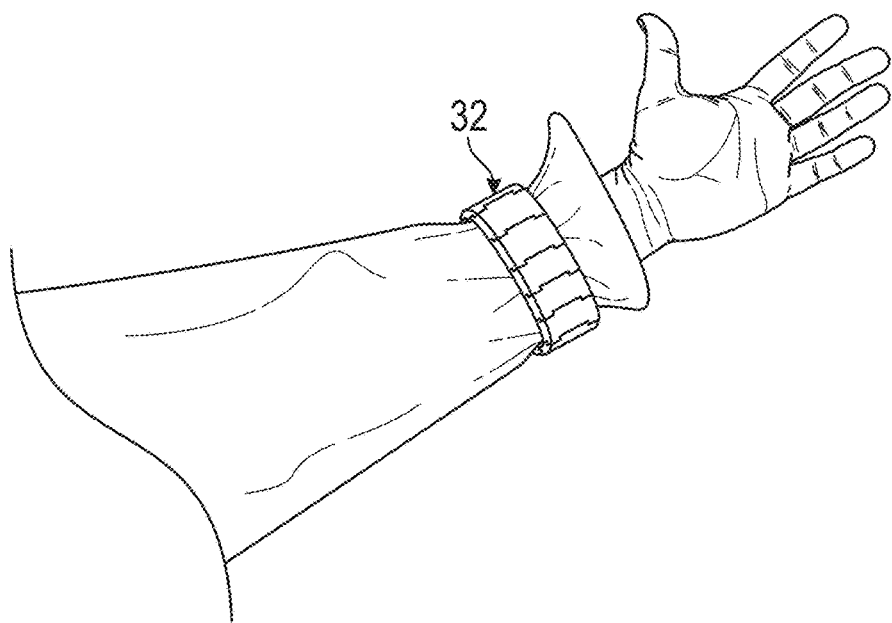

It is also contemplated to employ that the bands (32, 32', 32") configured in accordance with the present invention in connection with a wide variety of medical applications. For example, a band (32) according to the present invention may be used as a cuff attachment to secure and hold the cuffs of medical scrubs around the wrists of a wearer, as shown in FIGS. 9A and 9B. Other similar, non-medical, applications are also contemplated. For example, the bands (32, 32', 32") can be incorporated into smart clothing, such as belts, shirts, or pants or clothing needed under special, environmental conditions, such as space or fire suits, to facilitate personalized fitting in combination with or as an alternative to elastic or hook-and-loop (i.e., Velcro®) type fasteners.

Figure 10A:
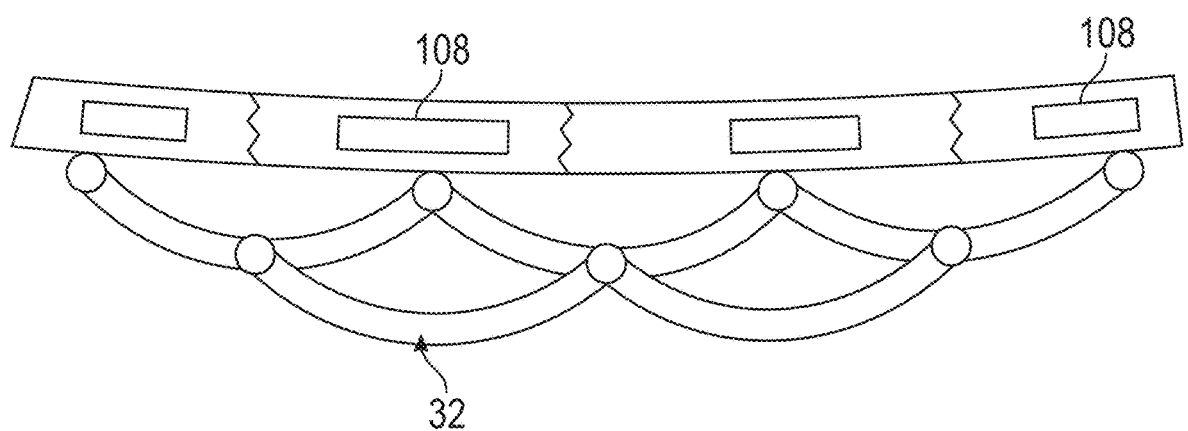
Figure 10B:
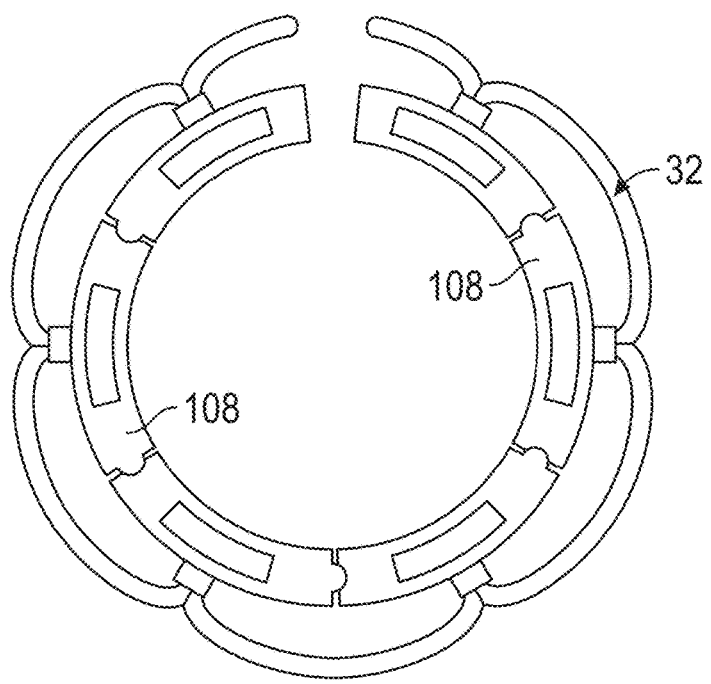

Another medical application is shown in FIGS. 10A and 10B, wherein a plurality of heat or cold packs (108) or the like may be affixed to a body part, such as an upper or lower extremity, by employing one or more bands (32) according to the present invention. In other examples of medical uses, one or more bands (32) in accordance with the present invention may be employed in connection with compression bandages, blood pressure cuffs, etc.

Figure 11A:
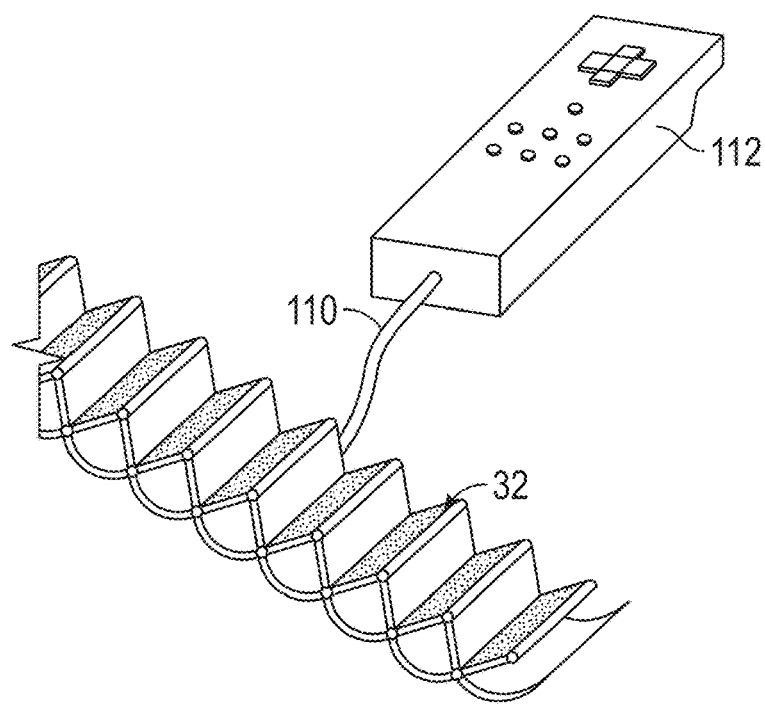
Figure 11B:
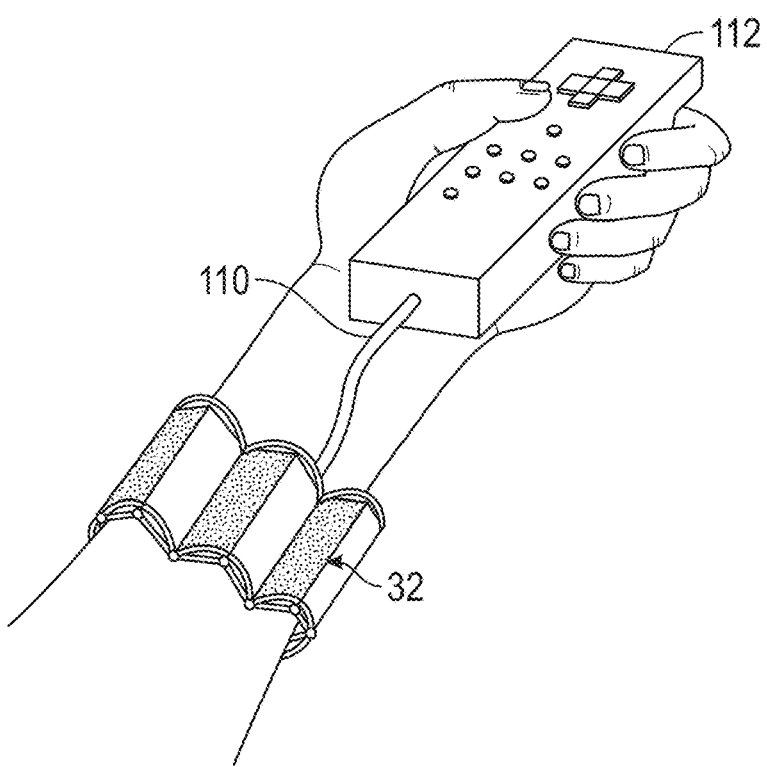

FIGS. 11A and 11B show another exemplary use, wherein a band (32) in accordance with the present invention may be used in connection with a safety tether (110) for a gaming device (112) to attach the device to a player's wrist, such that it is not accidentally thrown during gameplay.

Figure 12A:
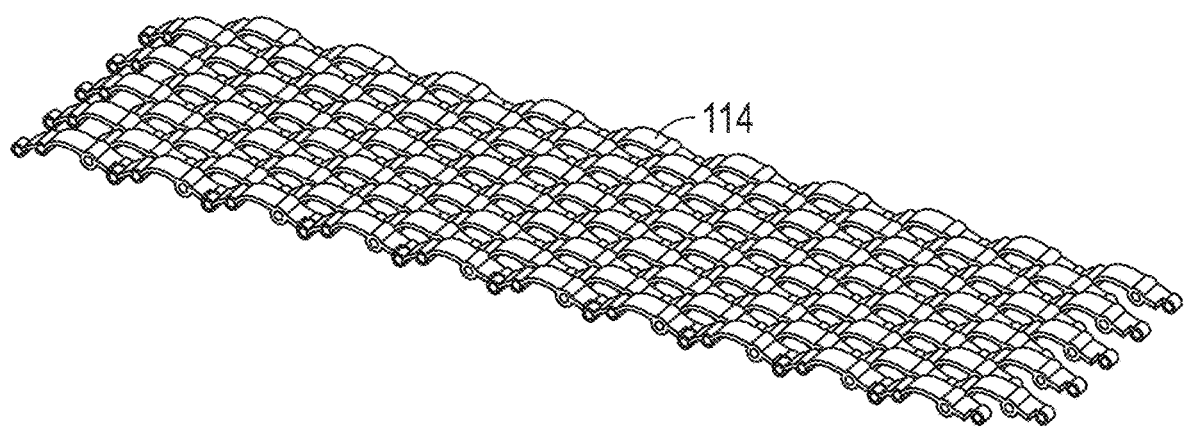
Figure 12B:
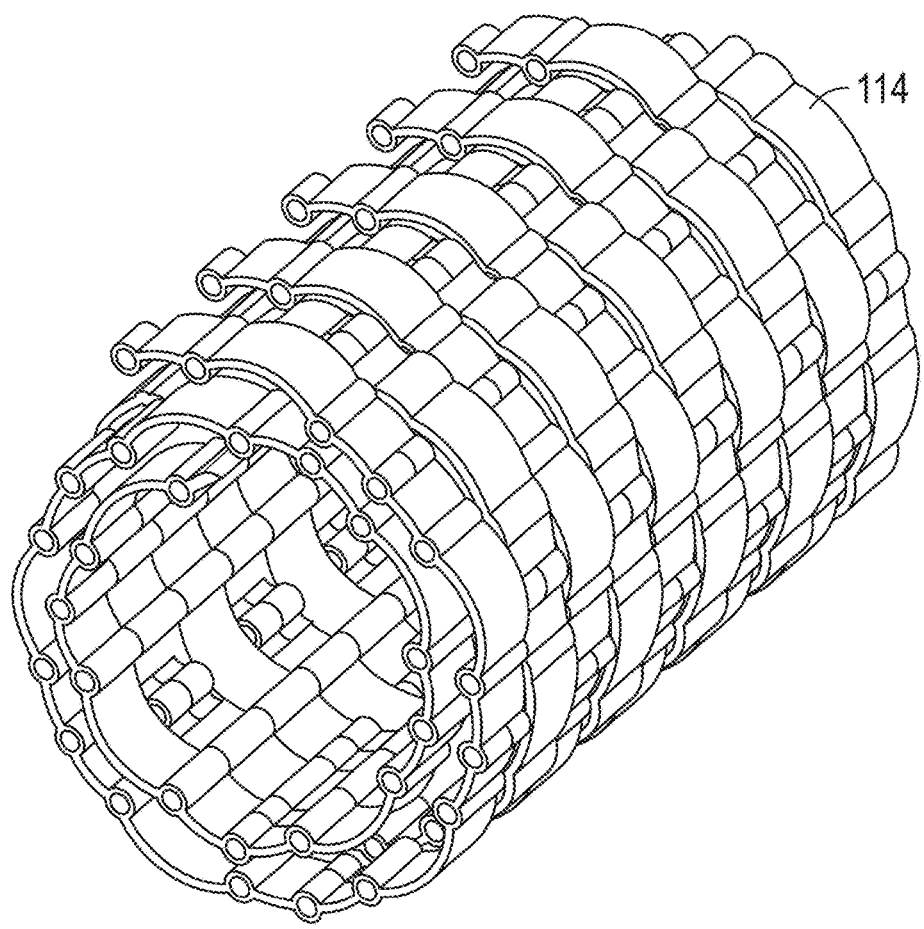

While most of the aforementioned uses contemplated for bands (32) in accordance with the present invention involve use as a wearable of some kind (i.e., a device configured to be wrapped around a body part), it is also envisioned that the bands (32) may be used in significantly different applications. For example, the bands (32) may be scaled up for much larger uses involving much larger forces, such as being used in connection with a cot or a sleeping mat or the like (114). Such an exemplary cot/mat (114) is shown deployed in FIG. 12A, and in a closed/rolled up configuration in FIG. 12B, thereby providing a relatively compact and light weight cot/mat that may be particularly useful for camping, hiking, mountain climbing or the like.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A band comprising a plurality of bistable compliant links cooperating with one another,
wherein each of said plurality of links comprises:
a compliant section having first and second ends;
a first rigid section extending from the first end of said compliant section, said first rigid section having first and second ends; and
a second rigid section extending from the second end of said compliant section, said second rigid section having first and second ends;
wherein the first rigid section of a first link of said plurality of links is pivotally connected to the second rigid section of a second link of said plurality of links at a point adjacent to the first end of the first rigid section of the first link and at a point adjacent to the first end of the second rigid section of the second link and is pivotally connected to the second rigid section of a fourth link of said plurality of links at a point adjacent to the second end of the first rigid section of the first link and at a point adjacent to the second end of the second rigid section of the fourth link;
wherein the second rigid section of the first link is pivotally connected to the first rigid section of a third link of said plurality of links at a point adjacent to the first end of the second rigid section of the first link and at a point adjacent to the first end of the first rigid section of the third link and is pivotally connected to the first rigid section of a fifth link of said plurality of links at a point adjacent to the second end of the second rigid section of the first link and at a point adjacent to the second end of the first rigid section of the fifth link; and
wherein when said plurality of links are pivoted with respect to each other past a threshold position toward a closed position, the plurality of links are biased toward the closed position by forces created by the compliant sections of the plurality of links and wherein when said plurality of links are pivoted with respect to each other past the threshold position toward an open position, the plurality of links are biased toward the open position by forces created by the compliant sections of the plurality of links.

2. The band of claim 1, wherein the second rigid section of the second link is pivotally connected to the first rigid section of the third link at a point adjacent to the second end of the second rigid section of the second link and at a point adjacent to the second end of the first rigid section of the third link.

3. The band of claim 2, wherein the second rigid section of the fourth link is pivotally connected to the first rigid section of the second link at a point adjacent to the first end of the second rigid section of the fourth link and at a point adjacent to the first end of the first rigid section of the second link.

4. The band of claim 3, wherein the second rigid section of the third link is pivotally connected to the first rigid section of the fifth link at a point adjacent to the first end of the second rigid section of the third link and at a point adjacent to the first end of the first rigid section of the fifth link.

5. The band of claim 1, wherein the forces created by the compliant sections biasing the plurality of links toward the closed position and biasing the plurality of links toward the open position are caused by elastic deformation of the compliant sections.

6. The band of claim 5, wherein the forces created by elastic deformation of the compliant sections increase as the plurality of links are pivoted with respect to each other from the open position toward the threshold position and from the closed position toward the threshold position, and wherein the forces created by elastic deformation of the compliant sections decrease as the plurality of links are pivoted with respect to each other from the threshold position toward the open position and from the threshold position toward the closed position.

7. The band of claim 1 wherein the compliant section, the first rigid section and the second rigid section of each of said plurality of links are formed as a monolithic unit.

8. The band of claim 1 wherein, for each of said plurality of links, said compliant section, said first rigid section and said second rigid section are formed as separate elements that are connected to one another.

9. The band of claim 8 wherein, for each of said plurality of links:
   said first rigid section is pivotally connected to the first end of said compliant section; and
   said second rigid section is pivotally connected to the second end of said compliant section.

10. The band of claim 1 wherein each of said compliant sections has an arcuate cross-section.

11. The band of claim 1 wherein each of said rigid sections is generally straight in cross-section.

12. The band of claim 1 wherein each of said rigid sections has an arcuate cross-section.

13. The band of claim 1 further comprising a plurality of passive links in addition to said plurality of bistable compliant links.

14. The band of claim 1 wherein each of said plurality of bistable compliant links comprises a material selected from the group consisting of polypropylene, acrylonitrile butadiene styrene (ABS), acrylic, poly (lactic acid) (PLA), silicone, rubber, polyethylene terephthalate glycol (PETG), flexible glass, stainless steel, aluminum, copper, titanium, carbon fiber, wood and combinations thereof.

15. The band of claim 14 wherein each of said plurality of bistable compliant links comprises at least one of the following materials: polypropylene, acrylonitrile butadiene styrene (ABS), stainless steel and aluminum.

16. The band of claim 1 wherein the plurality of bistable compliant links define an article of jewelry or a watch band configured to be attached to a watch body.

17. The band of claim 1 wherein the plurality of bistable compliant links define a medical article selected from the group consisting of a medical instrument holder, a cuff attachment for scrubs, a compression bandage, a blood pressure cuff, and a cuff for affixing cold or heat wraps.

18. The band of claim 1 wherein the plurality of bistable compliant links define a safety tether for a gaming device.

19. The band of claim 1 wherein the plurality of bistable compliant links are incorporated into a flexible mobile communications device adapted to wrap around a body part.

20. The band of claim 1 wherein the plurality of bistable compliant links define a cot or a sleeping pad.

21. A band comprising a plurality of bistable compliant links pivotally attached to one another, each of said plurality of links comprising:
   a compliant section;
   a first rigid section extending from the compliant section; and
   a second rigid section extending from the compliant section;
   wherein said plurality of links are pivotally attached to one another via the first and second rigid sections;
   wherein when said plurality of links are pivoted with respect to each other past a threshold position toward a closed position, the plurality of links are biased toward the closed position by forces created by the compliant sections of the plurality of links and wherein when said plurality of links are pivoted with respect to each other past the threshold position toward an open position, the plurality of links are biased toward the open position by forces created by the compliant sections of the plurality of links; and
   wherein the forces created by the compliant sections biasing the plurality of links toward the closed position and biasing the plurality of links toward the open position are caused by elastic deformation of the compliant sections.

22. The band of claim 21,
   wherein the first rigid section of a first link of said plurality of links is pivotally connected to the second rigid section of a second link of said plurality of links;
   wherein the second rigid section of the first link is pivotally connected to the first rigid section of a third link of said plurality of links; and
   wherein the second rigid section of the second link is pivotally connected to the first rigid section of the third link.

23. The band of claim 21 wherein the forces created by elastic deformation of the compliant sections increase as the plurality of links are pivoted with respect to each other from the open position toward the threshold position and from the closed position toward the threshold position, and wherein the forces created by elastic deformation of the compliant sections decrease as the plurality of links are pivoted with respect to each other from the threshold position toward the open position and from the threshold position toward the closed position.

24. The band of claim 21 wherein the compliant section, the first rigid section and the second rigid section of each of said plurality of links are formed as a monolithic unit.

25. The band of claim 21 wherein, for each of said plurality of links, said compliant section, said first rigid section and said second rigid section are formed as separate elements that are connected to one another.

26. The band of claim 25 wherein, for each of said plurality of links:
   said first rigid section is pivotally connected to a first end of said compliant section; and
   said second rigid section is pivotally connected to a second end of said compliant section.

27. The band of claim 21 wherein each of said compliant sections has an arcuate cross-section.

28. The band of claim 21 wherein each of said rigid sections is generally straight in cross-section.

29. The band of claim 21 wherein each of said rigid sections has an arcuate cross-section.

30. The band of claim 21 further comprising a plurality of passive links in addition to said plurality of bistable compliant links.

31. The band of claim 21 wherein each of said plurality of bistable compliant links comprises a material selected from the group consisting of polypropylene, acrylonitrile butadiene styrene (ABS), acrylic, poly (lactic acid) (PLA), silicone, rubber, polyethylene terephthalate glycol (PETG), flexible glass, stainless steel, aluminum, copper, titanium, carbon fiber, wood and combinations thereof.

32. The band of claim 31 wherein each of said plurality of bistable compliant links comprises at least one of the following materials: polypropylene, acrylonitrile butadiene styrene (ABS), stainless steel and aluminum.

33. A band comprising a plurality of bistable compliant links cooperating with one another,
   wherein each of said plurality of links comprises:
      a compliant section having first and second ends;

a first rigid section extending from the first end of said compliant section, said first rigid section having first and second ends; and a second rigid section extending from the second end of said compliant section, said second rigid section having first and second ends;

wherein the first rigid section of a first link of said plurality of links is pivotally connected to the second rigid section of a second link of said plurality of links at a point adjacent to the first end of the first rigid section of the first link and at a point adjacent to the first end of the second rigid section of the second link;

wherein the second rigid section of the first link is pivotally connected to the first rigid section of a third link of said plurality of links at a point adjacent to the first end of the second rigid section of the first link and at a point adjacent to the first end of the first rigid section of the third link;

wherein the second rigid section of the second link is pivotally connected to the first rigid section of the third link at a point adjacent to the second end of the second rigid section of the second link and at a point adjacent to the second end of the first rigid section of the third link; and wherein when said plurality of links are pivoted with respect to each other past a threshold position toward a closed position, the plurality of links are biased toward the closed position by forces created by the compliant sections of the plurality of links and wherein when said plurality of links are pivoted with respect to each other past the threshold position toward an open position, the plurality of links are biased toward the open position by forces created by the compliant sections of the plurality of links.

34. The band of claim 33, wherein the forces created by the compliant sections biasing the plurality of links toward the closed position and biasing the plurality of links toward the open position are caused by elastic deformation of the compliant sections.

35. The band of claim 34, wherein the forces created by elastic deformation of the compliant sections increase as the plurality of links are pivoted with respect to each other from the open position toward the threshold position and from the closed position toward the threshold position, and wherein the forces created by elastic deformation of the compliant sections decrease as the plurality of links are pivoted with respect to each other from the threshold position toward the open position and from the threshold position toward the closed position.

* * * * *